Nov. 27, 1951     J. A. PADJEN     2,576,413
WHEEL CHAIR

Filed Sept. 11, 1947     5 Sheets-Sheet 1

Inventor
John A. Padjen

By Clarence A. O'Brien
and Harvey B. Jacobson
Attorneys

Nov. 27, 1951      J. A. PADJEN      2,576,413
WHEEL CHAIR
Filed Sept. 11, 1947      5 Sheets-Sheet 2
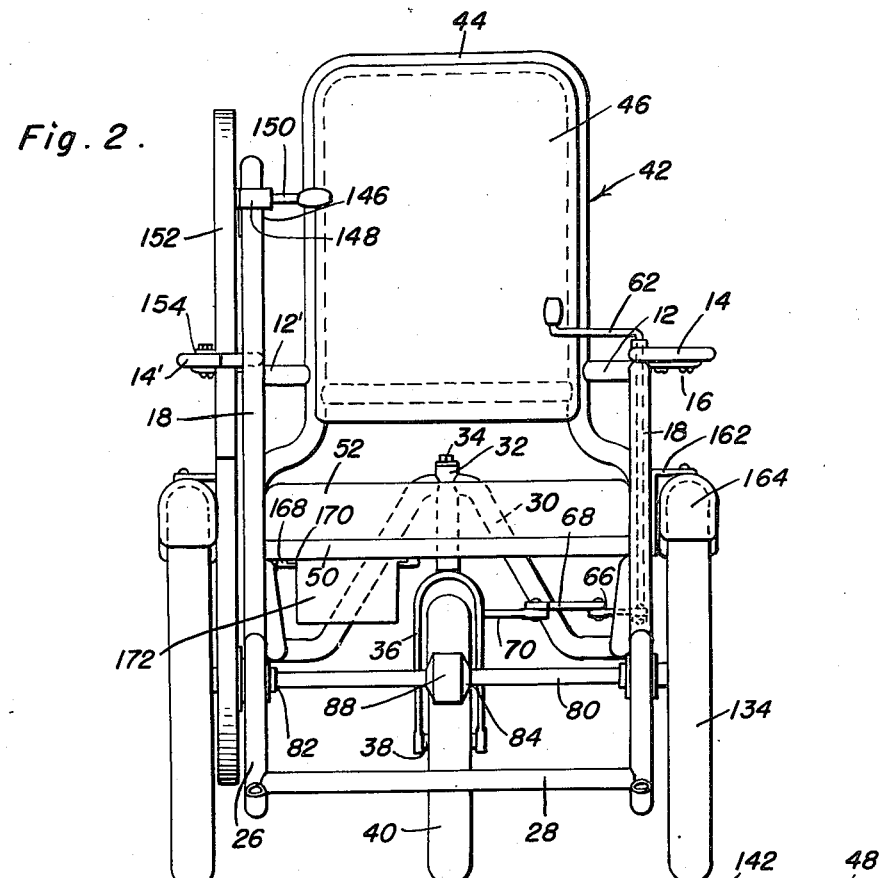
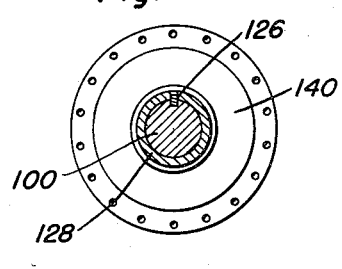
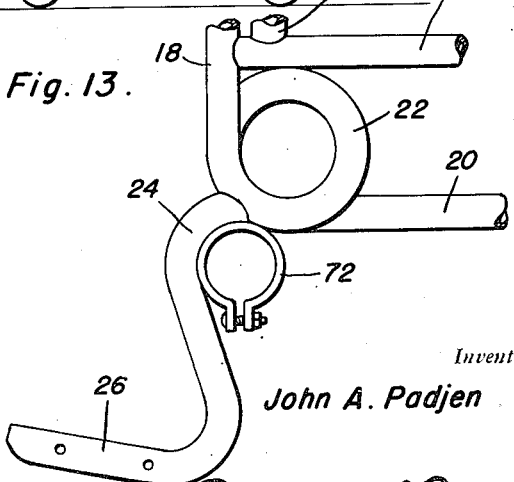
Inventor
John A. Padjen

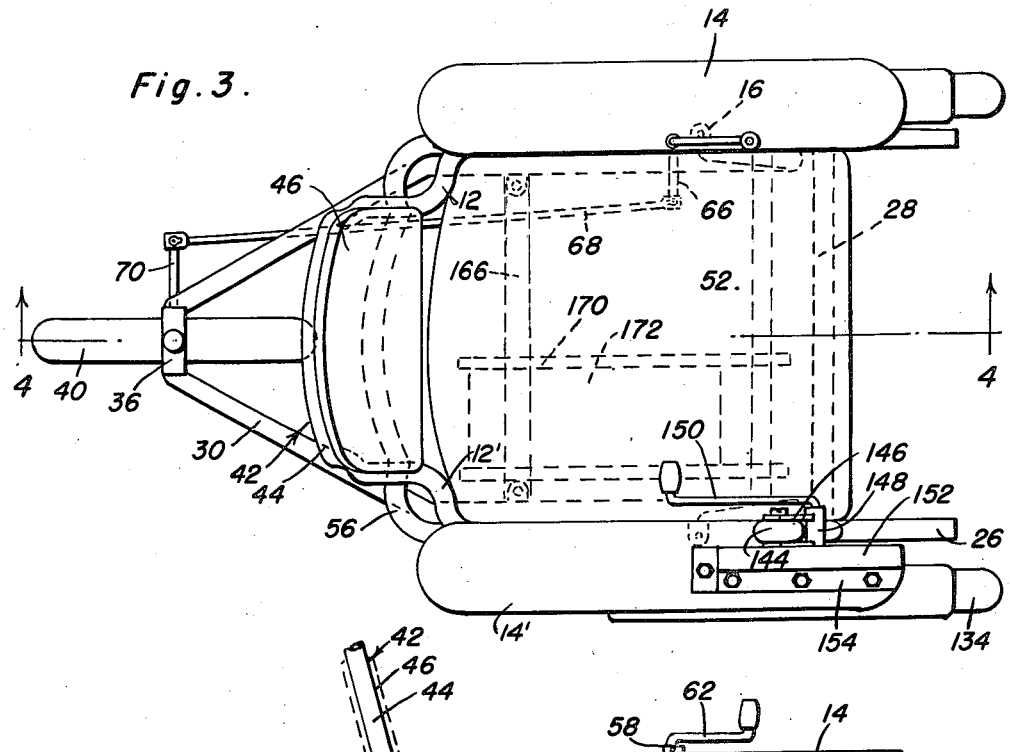
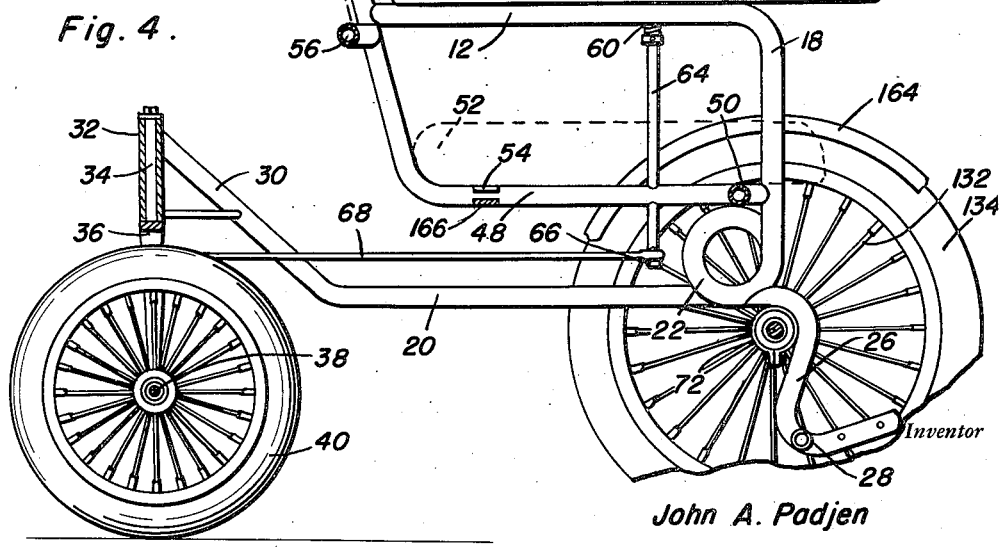

Nov. 27, 1951 J. A. PADJEN 2,576,413
WHEEL CHAIR
Filed Sept. 11, 1947 5 Sheets-Sheet 4

Inventor
John A. Padjen

Nov. 27, 1951  J. A. PADJEN  2,576,413
WHEEL CHAIR
Filed Sept. 11, 1947  5 Sheets-Sheet 5
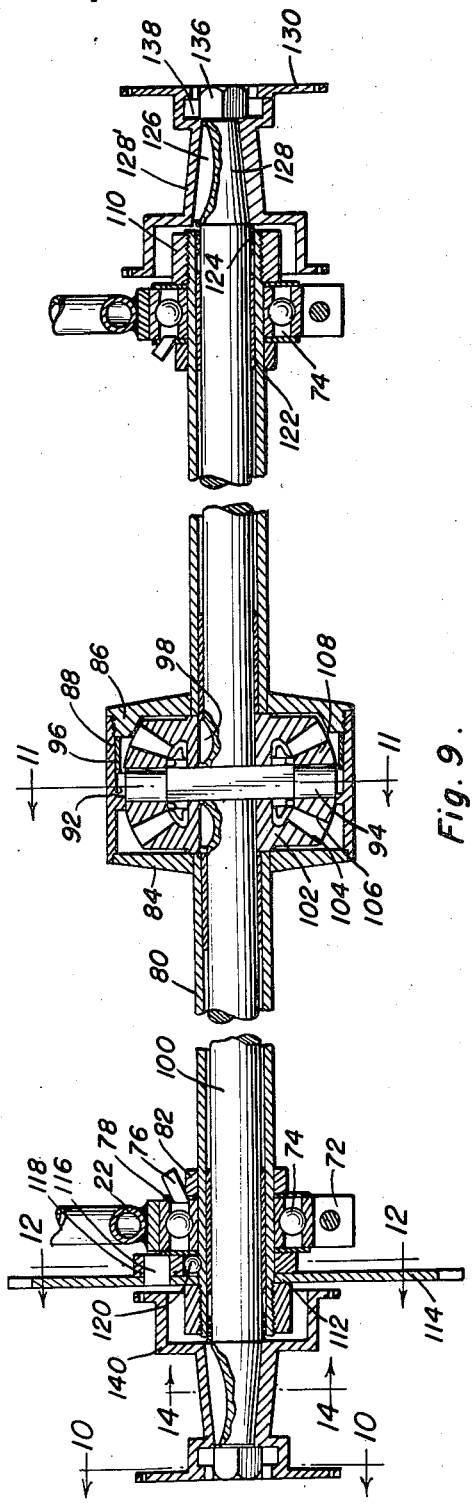
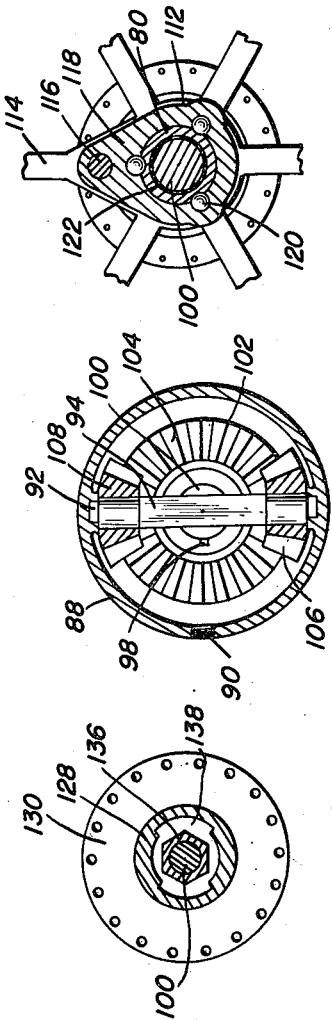
Inventor
John A. Padjen
By *Clarence A. O'Brien and Harvey B. Jacobson*
Attorneys Patented Nov. 27, 1951

2,576,413

UNITED STATES PATENT OFFICE 2,576,413

WHEEL CHAIR

John A. Padjen, Midvale, Utah

Application September 11, 1947, Serial No. 773,438

4 Claims. (Cl. 280—250)

This invention relates to new and useful improvements in wheel chairs and the primary object of the present invention is to provide a pair of axles supporting wheels and novel and improved means for imparting differential speeds to the axles.

Another important object of the present invention is to provide a wheel chair including a wheeled frame, a guide wheel for the frame and a steering mechanism conveniently mounted on the frame for quickly operating said guide wheel with great ease to the occupant.

Another object of the present invention is to provide a wheel chair including axle casings, manual means operatively connected to the casings for rotating the same and novel and improved means carried by the casing and connected to the axles, rotatably mounted within the casings, for imparting differential speed thereto.

Another object of the present invention is to provide a wheel chair including a frame supporting a back-rest, seat and foot-rest, so designed as to give the greatest comfort to the occupant of the same.

A further object of the present invention is the provision of a wheel chair the parts of which are quickly and readily disassembled facilitating convenient shipping or storing of the same when not in use.

A still further aim of the present invention is to provide a wheel chair that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a front elevational view of Figure 1;

Figure 3 is a top plan view of Figure 1;

Figure 4 is a longitudinal vertical sectional view taken substantially on the plane of section line 4—4 of Figure 3;

Figure 9 is an enlarged transverse vertical sectional view showing the mechanism for imparting differential speed to the axles of the driven wheels, and with parts thereof broken away and shown in section;

Figure 10 is a vertical sectional view taken substantially on the plane of section line 10—10 of Figure 9;

Figure 11 is a vertical sectional view taken substantially on the plane of section line 11—11 of Figure 9;

Figure 12 is a vertical sectional view taken substantially on the plane of section line 12—12 of Figure 9;

Figure 13 is an enlarged fragmentary side elevational view showing the manner in which the foot-rest is secured to the chair frame; and, Figure 14 is a vertical sectional view taken substantially on the plane of section line 14—14 of Figure 9.

Figure 1:
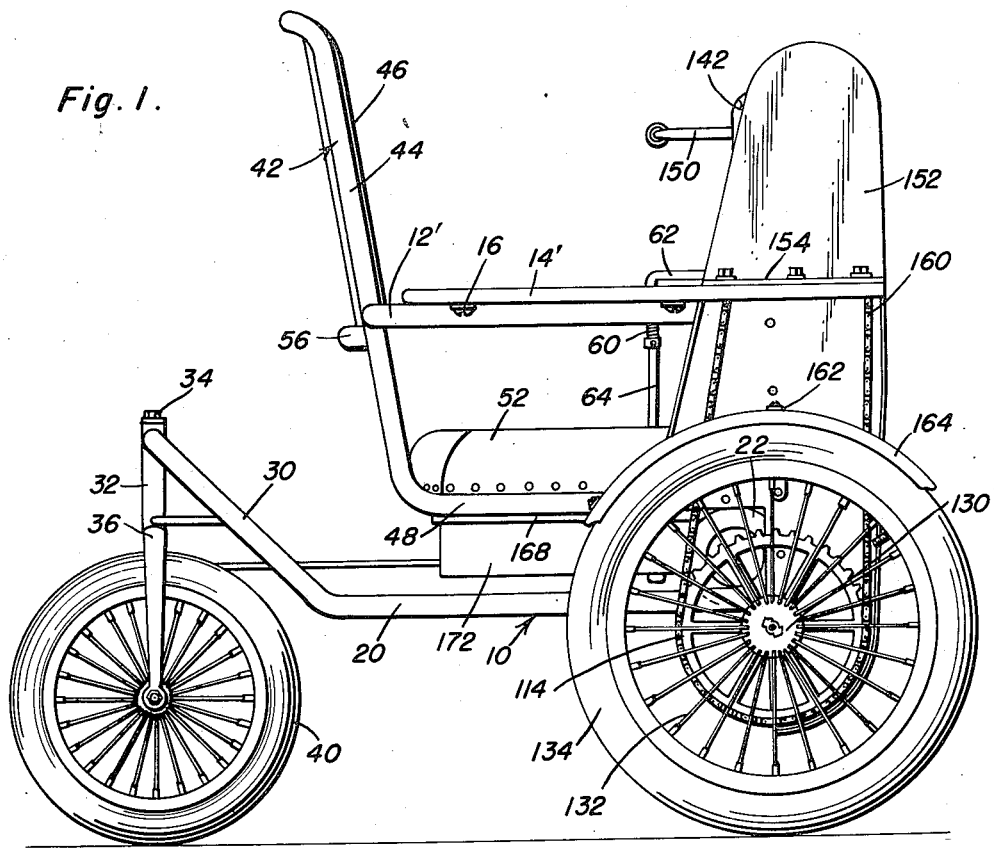
Figure 1 is a side elevational view of the wheel chair constructed in accordance with the present invention.
Figure 8:
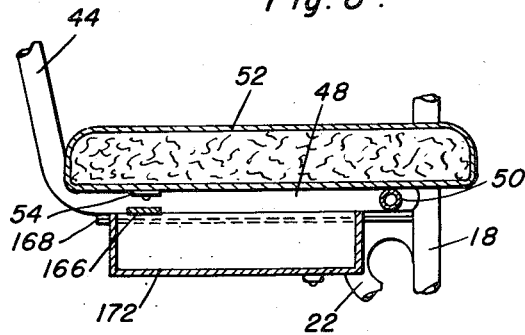
Figure 8 is a longitudinal vertical sectional view taken through the seat portion of the wheel chair and the tool chest, and with parts of the chair frame broken away and shown in section.

Referring now to the drawings in detail, wherein for the purpose of illustration, there is disclosed a preferred embodiment of the present invention, the numeral 10 represents the main frame generally comprising a pair of spaced parallel tubular side frame members each having a vertical portion 18 and a horizontal portion 20. At the juncture of the vertical portions 18 of the side frame members with their lower horizontal portions 20, there are provided integral loops or coils 22 that permit a slight recoil movement of the portions 20.

Fixedly secured to the lower periphery of each of the coils 22, is the outwardly turned portion 24 of a vertically inclined V-shaped member 26. Extending transversely between members 26 is a cross-bar 28 having its ends rigidly secured to members 26, to retain the members in spaced apart relationship and to function as a foot-rest for the user of the device. Obviously, any other means may be supported by the V-shaped members 26 to offer a foot platform for the user.

The rear ends 30 of legs or horizontal portions 20 being elongated are inclined upwardly and converge to form extensions that support a vertically disposed sleeve or bearing 32 in which there is pivotally and removably mounted a vertical pin or member 34. Rigidly secured to the lower portion of pin 34, is a U-shaped member or yoke 36, the lower ends of which support an axle 38 carrying the hub-portion of a preferably pneumatic guide wheel 40.

The numeral 42 represents an upper frame generally comprising an inverted U-shaped member 44 disposed at a vertically inclined angle to support a back-rest 46. The lower ends 48 of member 44, are turned forwardly and horizontally, and are fixedly secured to the vertical portions 18 of the frame 10. These ends 48 are connected by cross-bars 50 on which bears the forward portion of a cushion seat 52, suitably secured to said bar 50. The rear portion of the seat is fixedly secured to a transverse bar 54 recessed in a notch provided in ends 48. The rear ends of horizontal arms or bars 12 and 12' are secured to the member 44 by welding or any other suitable means to further support and retain the back-rest at an inclined vertical angle, as shown in Figure 1. Arm 12 is integrally formed with one of the vertical portions 18 whereas the arm 12' is secured at its forward end adjacent the upper end of the other portion 18. Extending transversely between a portion of member 44, is an arcuate brace or cross member 56 disposed adjacent the lower ends of the back-rest 46 and rearwardly from the inclined member 44. Arm rests 14 and 14' are detachably secured to the portions 12 and 12' by means of arm rest brackets 16.

Extending vertically through an aperture provided in the arm rest 14, is an internally threaded sleeve 58 receivably engaging the screw-threaded portion 60 of a crank-handle 62, that extends through the arm 12 of frame 10 and is removably secured to a vertically disposed rod 64 journalled for rotation in an aperture provided in one of the lower arms 48 of frame 42.

The lower terminal portion of rod 64 is fixedly secured to an arm 66, to which is pivotally mounted one end of a connecting link 68. The opposite end of link 68 is pivoted to the outer end of an arm 70 rigidly secured to member 36. As is obvious from the foregoing structure, a rotation of crank-handle 62 in one direction will pivot arm 66 rearwardly and push link 68 and arm 70 also rearwardly to turn wheel 40 at an angle. By rotating the crank-handle in an opposite direction, the wheel 40 will also be turned in an opposite direction.

Reference is now directed to Figures 9–14 inclusive wherein there is shown a preferred embodiment of the means for imparting differential speed to the forward wheels of the device.

Fixedly secured to the rear of the V-shaped supporting members 26, is an adjustable split clamp 72 supporting ball bearings 74 having grease fittings 76 and removable dirt excluder plates 78.

Journalled for rotation in bearings 74 are the outer ends of a pair of transverse axle casings or bearings 80 on which are rigidly secured by welding or the like, retaining rings or flanges 82 that prevent inward movement of bearings 74 and plates 78 on the casings.

Rigidly secured to the inner adjacent end of casing 80, are differential housing plates 84, one of which is provided with an annular threaded flange 86 that receivably engages the internally threaded end of a differential housing or casing 88 having a grease retainer plug 90. Recesses are provided in the inner periphery of casing 88 to removably engage the reduced terminal portions 92 of a spider pinion pin 94 with locking plates 96 forced into an opening communicating with the recesses to hold the pin 94 in a locked position thereto.

Keyed as at 98, to the inner adjacent ends of a pair of axles 100 journalled for rotation in casings 80, is a pair of differential housing gears 102 having a plurality of circumferentially spaced bevel teeth 104 that engage the bevel teeth 106 of a pair of spider pinions 108 journalled on the ends of pin 94.

The outer ends of the casings 80 are externally threaded to engage lock-nuts 110 bearing against the outer dirt excluder of one of the bearing plates and the outer face of the hub-portion 112 of a sprocket element 114 coupled by pin 116 to a sprocket coupler 118 that is keyed on one end of one of the casings 80, by balls or spherical elements 120, as best shown in Figure 12. The purpose of this sprocket 114 will be more fully described in the use of the device.

A bushing 122 carried by the inner periphery of the casings 80 for the axles 100, is retained in position by coil springs or the like 124 frictionally engaging the axles adjacent their outer ends. Keyed as at 126 to the tapered ends 128 of the axles 100 that project outwardly from the ends of the casings 80, are hubs 128' having hub plates 130 which engage the spokes 132 of the pneumatic forward wheels 134 for the device.

Nuts 136 threadedly engaged on the outer ends of the axles are fitted in an enlarged recess 138 provided in the hub plates. This recess affords means for engaging a suitable tool used in removing the hubs from the axles or the nuts 136 from the ends of the axles.

The hubs 128' are also provided with a cup-shaped member 140 that embraces lock-nuts 110 loosely, to prevent dirt or the like from entering the casing 80.

Figure 5:
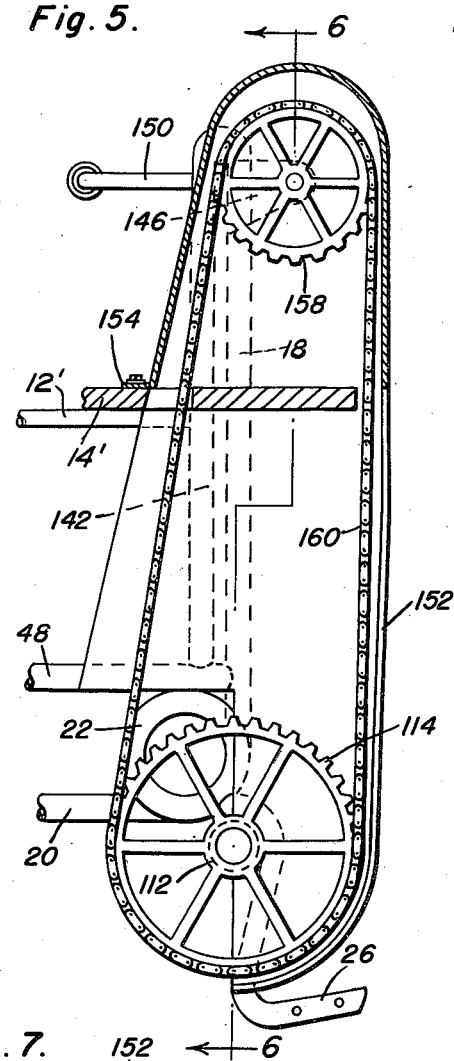
Figure 5 is an enlarged fragmentary vertical sectional view of the mechanism for rotating the axle casings and differential housing.
Figure 6:
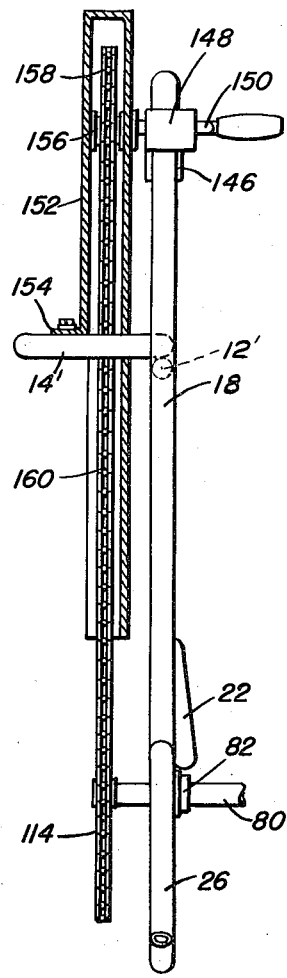
Figure 6 is a vertical sectional view taken substantially on the plane of section 6—6 of Figure 5.
Figure 7:
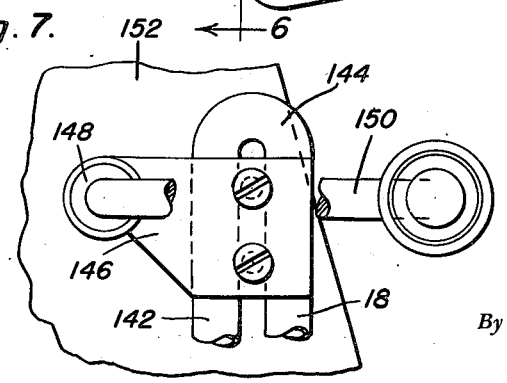
Figure 7 is an enlarged fragmentary side elevational view showing the manner in which the crank handle of the propelling mechanism is adjustably mounted on the chair frame, and with parts broken away and shown in section.

Reference is now directed to Figures 5–7 wherein there is disclosed the manner for driving the forward wheels.

An upright 142 projects upwardly from one of the arms 48 and is formed with a loop 144 that is integrally formed with one of the vertical portions 18 to adjustably receive a pair of supporting plates 146 that bear against opposite sides of said looped portion. These plates are connected and supported by a bearing 148 in which there is journalled one end of a crank handle 150, which in turn, may be operatively connected to any suitable source of power for actuating the same or which may be actuated manually.

The numeral 152 represents a shield open at its lower portion and provided with a flanged portion 154 that is removably secured to the arm rest 14'. A shaft 156 journalled on the shield supports an upper sprocket 158, and the shaft 156 is operatively connected to one end of crank-handle 150. An endless chain 160 connects sprocket 158 to sprocket 114. By adjusting plates 146 vertically on upright 142, the tension in chain 160 may be also adjusted.

Removably secured to the shield 152 and the web-portion 18 of the frame 10 on opposite sides of the device, are angle iron brackets 162 supporting arcuate wheel shields or fenders 164.

Rigidly secured between bar 50 and a further crossbar 166 between arms 48, is a pair of spaced longitudinal parallel guide tracks 168 that slidably engage the outwardly turned flanged portion 170 of a tool chest 172.

In practical use of the device, by rotating handle 150, sprocket 158 and sprocket 114 are likewise rotated causing a rotation of axle bearings 80 and differential housing 88. Since the pin 94 is fixedly mounted in the differential housing, it will also rotate with the differential housing and spider pinions 108 will engage gears 102 to effect a rotation of the axles 100 and wheels 134. Obviously, when the steering mechanism is operated as previously described, to turn wheels 40, the speed to the respective axles will be differential speeds to permit safe turning of the device in any direction.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A wheel chair comprising a pair of spaced parallel tubular side frame members each having a vertical portion and a horizontal portion, coils at the junctions of said vertical portions with said horizontal portions, an inverted U-shaped seat frame including a pair of leg portions and a web portion joining said leg portions, a horizontally extending arm projecting laterally from each of said leg portions and fixed to said vertical portions, said horizontal portions including upwardly converging extensions, a vertically disposed sleeve supported by said extensions, a wheel supporting yoke having an upstanding portion journalled in said sleeve, means attached to said yoke for turning the wheel yoke, a pair of V-shaped tubular foot platform supporting members fixed to and depending from said coils, a cross-bar terminally secured to said V-shaped tubular members, split clamps mounted on said V-shaped members, and a wheel axle mounted in said clamps.

2. A wheel chair comprising a pair of spaced parallel tubular side frame members each having a vertical portion and a horizontal portion, coils at the junctions of said vertical portions with said horizontal portions, an inverted U-shaped seat frame including a pair of leg portions and a web portion joining said leg portions, a horizontally extending arm projecting laterally from each of said leg portions and fixed to said vertical portions, said horizontal portions including upwardly converging extensions, a vertically disposed sleeve supported by said extensions, a wheel supporting yoke having an upstanding portion journalled in said sleeve, means attached to said yoke for turning the wheel yoke, a pair of V-shaped tubular foot platform supporting members fixed to and depending from said coils, a cross-bar terminally secured to said V-shaped tubular members, split clamps mounted on said V-shaped members, a wheel supporting axle mounted in said clamps, an upper horizontal arm connecting the vertical portion of one side frame member to one leg portion of said seat frame, a first arm rest mounted on said upper arm, means operatively connected to said axle for driving the axle, a vertical housing mounted on one of said side frame members, and another arm rest supported by the housing and the other leg portion of said seat frame.

3. A wheel chair comprising first and second tubular side frame members, each of said side frame members including a horizontal portion, a vertical portion and a coil joining the vertical and horizontal portions, a foot platform supporting member secured to each coil, a clamp mounted on each of said supporting members and underlying said coils, a forward axle mounted in said clamps, a seat frame supported by and between said side frame members, an arm rest supporting bar joining the vertical portion of the first side member to the seat frame, an arm rest mounted on said bar, another arm rest between the vertical portion of the second side member and the seat frame, a driven sprocket mounted on one end of said axle, a bearing slidably mounted on the vertical portion of said second frame, a shaft journalled in said bearing, a drive sprocket on said shaft and overlying the driven sprocket, a sprocket chain trained about the two sprockets, and a rear wheel support carried by the horizontal portions of said frames.

4. The combination of claim 3 wherein said rear wheel support includes a pair of upwardly and rearwardly converging extensions on said horizontal portions, a vertical sleeve secured to the extensions, and a wheel supporting yoke having an upstanding portion rotatably supported in the sleeve.

JOHN A. PADJEN.

REFERENCES CITED

The following references are of record in the file of this patent:

UNITED STATES PATENTS

| Number | Name | Date |
| --- | --- | --- |
| 312,411 | Wallace | Feb. 17, 1885 |
| 354,642 | Linley et al. | Dec. 12, 1886 |
| 627,639 | Eames | June 27, 1899 |
| 2,431,112 | Everest et al. | Nov. 18, 1945 |

FOREIGN PATENTS

| Number | Country | Date |
| --- | --- | --- |
| 1,661 | Great Britain | Oct. 14, 1881 |
| 17,244 | Great Britain | 1897 |
| 233,550 | Great Britain | May 14, 1925 |